Oct. 26, 1971   G. SCHNITZLER   3,614,990
ELECTRICAL CONTROL ARRANGEMENT FOR STEERING OF VEHICLES
Filed March 3, 1969   3 Sheets-Sheet 1

INVENTOR
Gerhard SCHNITZLER
By his ATTORNEY

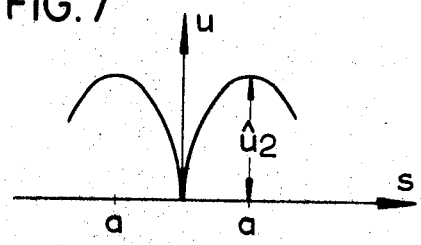
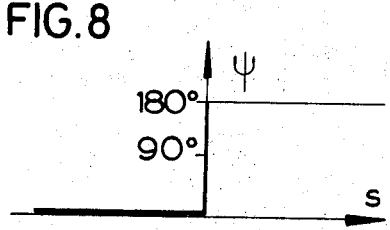
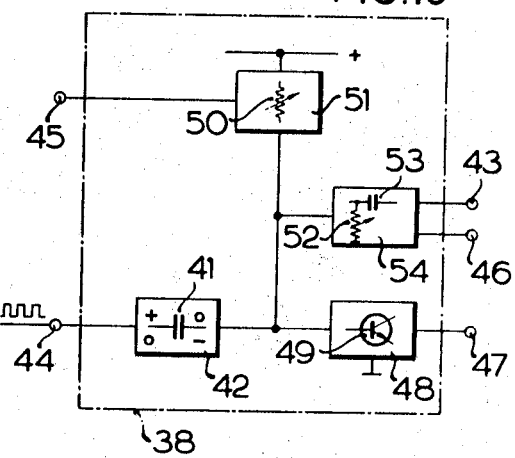
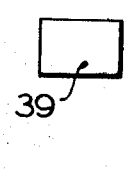
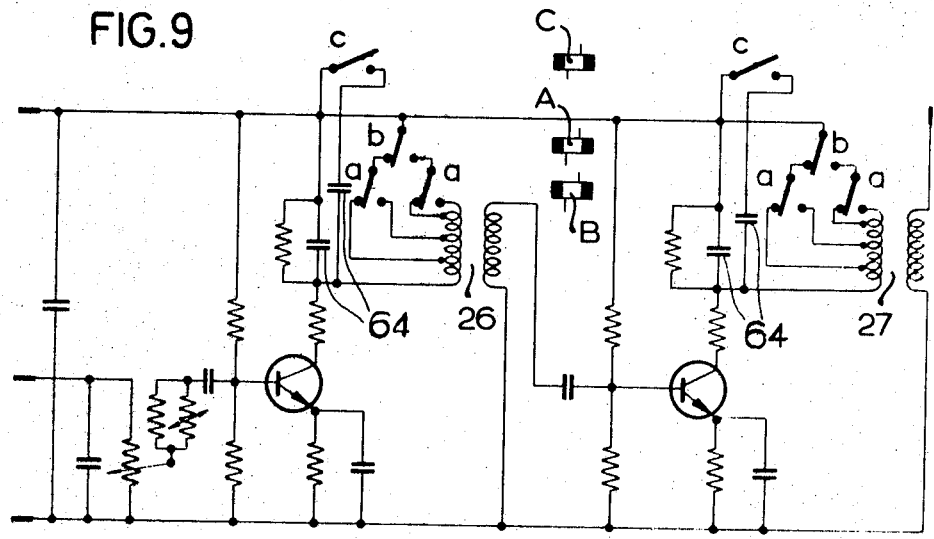

United States Patent Office

3,614,990
Patented Oct. 26, 1971

3,614,990
ELECTRICAL CONTROL ARRANGEMENT FOR STEERING OF VEHICLES
Gerhard Schnitzler, Gerlingen, Germany, assignor to Robert Bosch GmbH, Stuttgart, Germany
Filed Mar. 3, 1969, Ser. No. 804,061
Claims priority, application Germany, Mar. 2, 1968, P 16 13 991.6
Int. Cl. B62d 1/24
U.S. Cl. 180—98
17 Claims

ABSTRACT OF THE DISCLOSURE

An electrical vehicle steering arrangement in which the vehicle is controlled to move along a predetermined path. An electrical conductor stretched along the path is energized with alternating current of selected frequency. The conductor gives rise to an electromagnetic field which acts upon two coils mounted on the vehicle. One of these coils is arranged horizontally and transverse to the direction of motion of the vehicle, and is in proximity of the vehicle steering axle. The second coil is mounted in front of the first coil in the direction of motion, and is arranged vertical to the axis of the first coil. Voltages are induced in the coils so that the voltage of the first coil serves as a reference voltage for the one induced in the second coil. The relative phase of the induced voltages within the coils is indicative of the deviation of the vehicle from the prescribed path.

CROSS REFERENCE TO RELATED APPLICATIONS

This application is closely related to my copending and simultaneously filed application, Ser. No. 804,062, filed Mar. 3, 1969 under the title of Electrical Steering Arrangement for Vehicles.

BACKGROUND OF THE INVENTION

The present invention resides in an electrical control arrangement for the control of vehicles in accordance with a predetermined electromagnetic field. This electromagnetic field is established by applying alternating current to a conductor or cable stretched along the path of motion of the vehicle. At least two coils influenced by the magnetic field are sampled with respect to induced signals. The magnitude and phase relationship of the voltages induced within the two coils, form the basis for determining displacement from the predetermined path of motion established by the electromagnetic field.

In conventional control arrangements known in the art, the signal coils sampled lie next to each other and transverse to the path of motion. With this coil arrangement and the associated control apparatus, difficulties are incurred particularly when passing through narrow curves or taking the path in which a number of curves lie next to each other.

Accordingly, it is an object of the present invention to provide a steering arrangement which avoids the aforementioned disadvantages, and which returns the vehicle to the predetermined path of motion after the vehicle has deflected or has been displaced therefrom.

The control arrangement of the persent invention is thereby designed so that the coils are arranged one behind the other in the direction of motion. One coil is mounted preferably in proximity of the axle for steering the vehicle, and lies horizontally and transverse to the direction of motion. The voltage induced in this first coil is used as a reference voltage for a further voltage signal which is induced within a second coil arranged vertically with respect to the axis of the first coil and in the direction of motion.

SUMMARY OF THE INVENTION

An electrical steering arrangement for a vehicle controlled to move along a predetermined path. A conductor or cable is stretched along the path and establishes an electromagnetic field through an alternating current applied to the conductor. The control vehicle has mounted upon it a first coil lying horizontally and transverse to the direction of motion of the vehicle. This first coil is also within the proximity of the vehicle steering axle. A second coil is mounted in front of the first coil in the direction of motion, and is arranged vertical to the axis of the first coil. As a result of the electromagnetic field linking the coils, voltages are induced within the coils so that the voltage induced within the first coil serves as a reference coil for the voltage induced in the second coil. The arrangement is such that the phase relationship between the induced voltages is indicative of the displacement of the vehicle from the predetermined path.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 7 is a graphical representation of the voltage induced in the vertical coil as a function of the sidewise deflection of the vehicle;

FIG. 8 is a graphical representation of the phase relationship of the voltage induced in the vertical coil, as a function of the sidewise displacement of the vehicle;

FIG. 9 is a circuit diagram of a resonance amplifier used in the arrangement of FIG. 1;

FIG. 10 is a functional schematic diagram of a pulse width modulator used in the arrangement of FIG. 1; and FIG. 11 is a functional schematic diagram of a frequency generator used in the arrangement of FIG. 1

DESCRIPTION OF THE PREFERRED EMBODIMENTS

Figure 1:
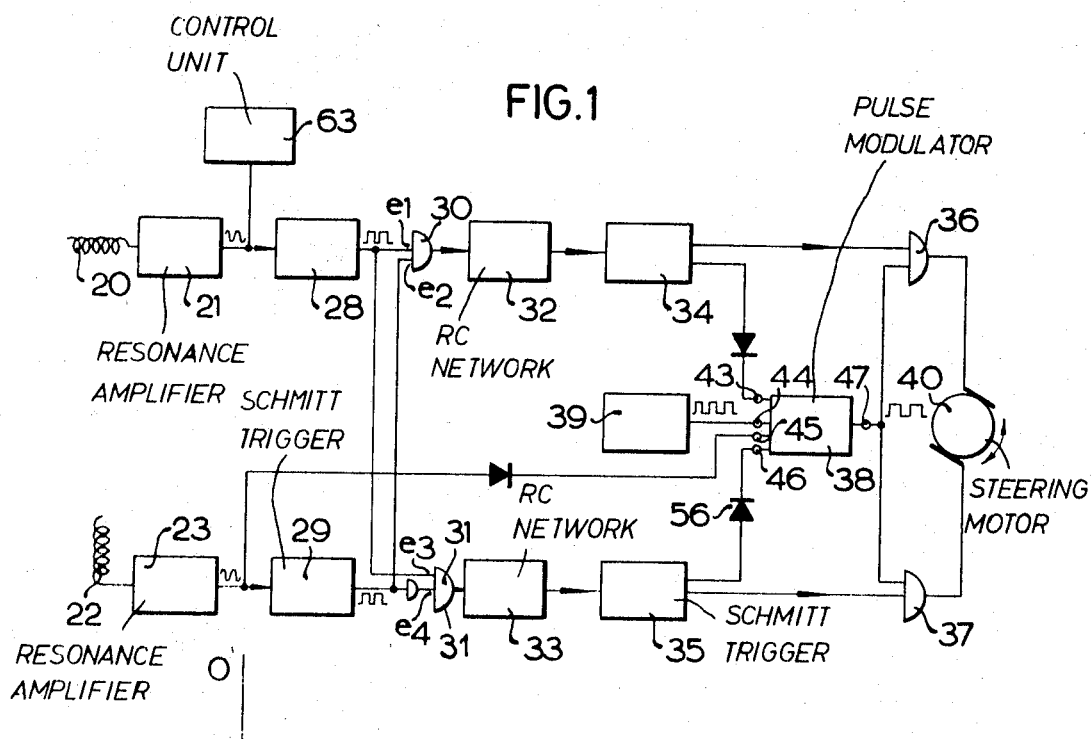
FIG. 1 is a functional block diagram of the steering arrangement, in accordance with the present invention.

Referring to the drawing, and in particular to FIG. 1, a horizontally arranged coil 20 is connected to a resonance amplifier 21. The coil 20 is designated, in what follows, as a reference coil. A vertically arranged coil 22 is connected to a resonance amplifier 23. This coil 22 is designated, in what follows, as the regulating signal coil. The regulating signal coil 22 is secured to a pole which projects preferably from the front of the vehicle. The pole can be securedly fixed to the vehicle itself, or it may be coupled to the axle of the vehicle which serves to steer the vehicle. The reference coil 20, on the other hand, is arranged in proximity to the axle which serves to steer the vehicle, and may thereby be secured to either the vehicle or the steering axle of the vehicle.

Figure 12:
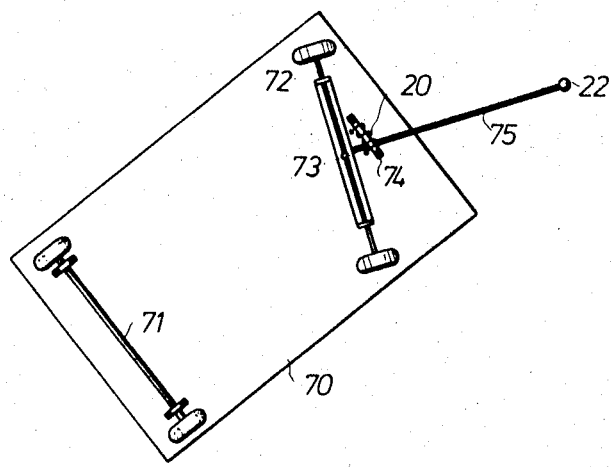
FIG. 12 is a bottom view of a vehicle equipped with the steering arrangement of the invention and showing the placement of the two coils 20 and 22.

The exact manner of placement of the coils 20 and 22 is shown in FIG. 12, which illustrates a vehicle 70, as seen from the bottom, equipped with the steering arrangement of the invention. At the rear end of the vehicle there is mounted a stationary axle 71 and at the front end a steering axle 72, which is free to turn about a pivot 73. The reference signal coil 20 is mounted on a carrier 74 near to the pivot 73. As previously remarked, the coil 20 can also be fixed to the steering axle 72. A pole 75 that projects in front of the vehicle 70 is fixed at its rear end to the steering axle 72. The front end of the pole 75 carries the regulating signal coil 22.

Figure 2:
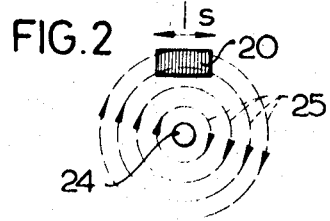
FIG. 2 shows the arrangement of a horizontal coil of the arrangement of FIG. 1 when present in a magnetic field surrounding a conductor.
Figure 3:
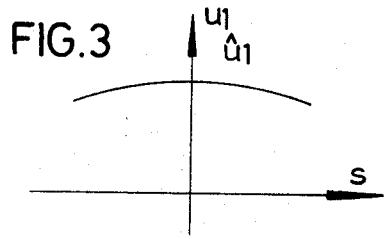
FIG. 3 is a graphical representation of the voltage induced within the horizontal coil of FIG. 2, as a function of the displacement of the vehicle.

In FIG. 2, a conductor 24 is surrounded by a magnetic field in which the lines of force are denoted by the broken or dashed lines 25. In the position of the reference coil 20 in the magnetic field shown in FIG. 2, a voltage is induced within the coil as a result of the perpendicular cutting or intersection of the lines of force with the turns of the coil. The induced voltage has a maximum value $\hat{u}_1$ which varies by only a small amount for sidewise displacements of the reference coil from the central vertical and perpendicular position shown in FIG. 2 relative to the conductor 24. The voltage function induced within the coil is designated as $u_1 = f(s)$, and is shown in FIG. 3. The phase angle $\psi$ of this voltage is constant. When the voltage $u_1$ drops below the predetermined value, which occurs when the vehicle is too far displaced from its predetermined path, the control unit 63 switches off the motor of the vehicle.

Figure 4:
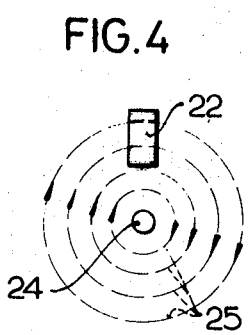
FIG. 4 to FIG. 6 are schematic arrangements and show the vertical coil used in the steering arrangement of FIG. 1, in different positions in relation to the magnetic field surrounding a conductor.
Figure 5:
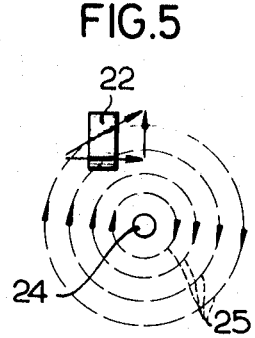
Figure 6:
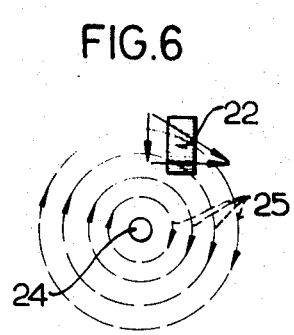

In the regulating signal coil 22, shown in three different positions in FIGS. 4 to 6, a voltage function $u_2 = f(s)$ prevails, which is graphically plotted in FIG. 7. The phase function $\psi = f(s)$ of this voltage is represented in FIG. 8. The magnitude of the voltage at the center position of the coil in accordance with FIG. 4, is zero.

When the coil 22 is displaced to either side of the central position, as shown in FIGS. 5 and 6, the amplitude of the induced voltage within the coil 22 increases until the displacement $a$ is attained. With further increases in the displacement, the induced voltage drops off, as shown in FIG. 7. The magnitude of the induced voltage is identical for equal displacements to either side of the central position. A phase shift of 180° is incurred, however, in the displacement along one side relative to the displacement along the opposite side from the central position. Voltages are processed by the control unit and are compensated essentially when displacements prevail between the two values $a$.

In comparing the voltages induced within the reference coil 20 and the regulating signal coil 22, it is possible that the two voltages $u_1$ and $u_2$ are either in phase or 180° out of phase. The voltage $u_1$ is applied to the resonance amplifier 21, whereas the induced voltage $u^2$ is applied to the resonance amplifier 23. The design of a resonance amplifier is shown in FIG. 9. In this exemplary embodiment of the amplifier, is a conventional two-stage selectable resonance amplifier. The inductances 26 and 27, as well as the capacitance 64 of the oscillating circuit may be switched around so that their magnitudes may be made variable. The switching function is accomplished with the aid of relays A, B and C, which are mounted within the unit of the resonance amplifier for the purpose of avoiding disturbances caused through, for example, switching capacitances, inductances, or stray signals. In this manner, the apparatus may be used with any desired type of vehicle.

Switching of the inductances is required only when the vehicle is to follow consecutively two different conductors which are excited with different frequencies. Excitation generators for the conductors are designed preferably in accordance with the apparatus shown in principle in FIG. 11. In such a design, a quartz oscillator 58 is used as the conventional component for determining the frequency. The output signal of the oscillator 58 becomes amplified in an amplifier 59 with more or more stages. A feedback coupling 60 connected in parallel with the amplifier 59, maintains the output current of the amplifier constant and independent of the load resistance connected to the output terminal 61 of the amplifier. The magnitude of this load resistance is determined by the length of the conductor 24. As a result of this design, voltages of equal magnitude are induced within the coils 20 and 22 for equal displacements from the conductors which are excited in different frequencies. These induced voltages then appear at the inputs of the resonance amplifiers 21 and 23.

The outputs of the resonance amplifiers 21 and 23 are applied, respectively, to Schmitt trigger circuits 28 and 29. An inverter is connected to the output $e_4$ of the Schmitt trigger 29. The Schmitt trigger circuits transform the sinusoidal voltages into rectangular pulse trains. The rectangular pulse train realized from the Schmitt trigger circuit 28 is applied to the input $e_1$ of the AND gate 30, and to the input $e_3$ of the AND gate 31. The rectangular pulse trains realized from the Schmitt trigger 29, on the other hand, are applied to the inputs $e_2$ of the AND gate 30 and $e_4$ of the AND gate 31. Through the use of these AND gates, a phase comparison is realized. With this arrangement, the vehicle is displaced to the left when the induced voltages within the reference coil 20 and the regulating signal coil 22 are in phase or of identical phase, and the outputs of the Schmitt trigger circuits 28 and 29 in the form of pulse signals are also in phase. When, on the other hand, the signals within the coils 20 and 22 are phase shifted by 180° from each other, and the outputs of the Schmitt trigger circuits are similarly out of phase by 180°, the vehicle is displaced to the right.

When the phase angles of the signals are equal, the AND gate 30 conducts, whereas the AND gate 31 conducts when the signals are out of phase. When no voltage is induced in the regulating signal coil 22, no signal is transmitted from the resonance amplifier 23 to the Schmitt trigger circuit 29, and neither the AND gate 30 or the AND gate 31 conduct. This situation when no voltage is induced within the regulating signal coil 22, occurs when the coil is precisely over the conductor 24. An RC network 32 is connected to the output of the AND gate 30. At the output of the RC network 32 appears a voltage signal which corresponds to the average value of the pulse signal applied to the input of the network. The output signal from the RC network 32 is applied to the input of a Schmitt trigger circuit 34. Depending upon the applied voltage, this Schmitt trigger 34 provides binary signals "0" or "1." The output of a Schmitt trigger circuit 34 is connected with an input of the AND gate 36, and with a pulse width control unit 38.

In an analogous manner, the output of the AND gate 31 is applied to the input of an RC network 33 which is followed by a Schmitt trigger circuit 35. The output of the Schmitt trigger circuit 35 is connected, on one hand, to an input of an AND gate 37, and, on the other hand, to the pulse width control arrangement 38.

The pulse width control unit 38, designed in accordance with FIG. 10, provides pulse signals for steering the steering motor. The width of the controlling pulses is made dependent upon the magnitude of the displacement of the vehicle from the conductor 24. Thus, wider pulses are produced with greater displacement. As a result, the rotational speed of the steering motor 40 is determined. A particular advantage of the pulse width control unit or pulse modulator 38 resides in the feature that no maximum torques of short duration arise from the motor through small displacements of the vehicle from the conductor 24. Thus, the pulse signals with amplitude corresponding to the opearting voltage of the steering motor 40 do not give rise to such maximum motor torques for small displacements of the vehicle in relation to the conductor 24.

An astable multivibrator 39 is connected to the input terminal 44 of the pulse modulator or pulse width control arrangement 38. The arrangement or embodiment of the pulse modulator 38 is shown, in principle, in FIG. 10.

The astable multivibrator produces voltage pulses at a frequency of preferably 130 Hz. and with very narrow pulse width. This pulse width is selected so that the steering motor 40 does not yet become activated and set into rotation by the pulses. A single one of these pulses is sufficient, however, to charge a capacitor 41 which forms the essential component of an energy storage unit 42. Under these circumstances, the left electrode of the capacitor 41 has positive potential applied to it, whereas the right electrode is at zero potential. With the occurrence of the pulse, the right electrode of the capacitor 41 is, at the first instant, at negative potential, whereas the left electrode exhibits zero potential. As long as the right electrode of the capacitor 41 is negative in relation to the emitter of a transistor 49 contained within the unit 48, the transistor 49 is turned off. The transistor remains in this turned-off or cut-off state until the negative charge of the capacitor 41 has been dissipated through the variable resistor 50 contained within the unit 51. As a result, an output voltage appears at the output terminal 47 of the unit 48, which corresponds to the binary magnitude "1." This signal at the output terminal 47 appears until the capacitor 41 becomes recharged. The output voltage of the terminal 47 is applied to the AND gates 36 and 37, since the output terminal is connected directly to the inputs of these gates.

The variable resistor 50 of the unit 51 can also be in the form of a transistor. The magnitude of this resistor is determined by the output voltage of the resonance amplifier 23, which is applied to the terminal 45. The arrangement is designed preferably so that the resistance 50 is small for larger output voltages of the resonance amplifier 23, and becomes larger, on the other hand, for smaller output voltages. As a result, pulses may appear at the output terminals 47 of the unit 48, in which the pulse width is dependent upon the voltage induced within the regulating signal coil 22 and amplified by the resonance amplifier 23.

For the purpose of providing the steering motor 40 of the vehicle with a substantial return or resetting pulse for small displacements from the conductor or cable 24, the steering arrangement is provided with a so-called D-hold. In this arrangement, a resistor 52 and capacitor 53 are contained within the unit 54 of the pulse modulator 38.

In operation, and when the vehicle is displaced from the conductor or cable 24, a signal with the binary designation "1" appears at the output of the Schmitt trigger circuit 35. The output of the Schmitt trigger circuit 35 is connected, by way of the diode 56, to the terminal 46 which, in turn, is coupled to the unit 54 contained in the resistor 52 and the capacitor 53. If the signal with the binary designation "1" appears at the output of the Schmitt trigger circuit 35, when the vehicle is displaced from the conductor or cable 24, a voltage corresponding to this binary designation is applied to the capacitor 53 which is discharged in the normal state. This applied voltage to the capacitor 53 has a short-circuit effect at the first instant, so that the voltage reaches the base of the transistor 49. As a result, the transistor 49 is held in the turned-off state until the capacitor 53 is charged. The width of these B pulses can be adjusted or set through the variable resistor 52 which determines the charging time of the capacitor 53. After that, the pulses for the steering motor 40 are produced as described above.

Depending upon whether the vehicle is deflected toward the left direction or toward the right, one of the AND gates 36 and 37 conduct. The pulses transmitted by these AND gates, therefore, reach the steering motor 40 and cause a left or right turn to take place. The steering motor 40 is preferably designed and constructed in the form of a series circuit motor with two separate field windings for left and right turning operations.

It will be understood that each of the elements described above, or two or more together, may also find a useful application in other types of constructions differing from the types described above.

While the invention has been illustrated and described as embodied in a steering arrangement for vehicles, it is not intended to be limited to the details shown, since various modifications and structural changes may be made without departing in any way from the spirit of the present invention.

What is claimed as new and desired to be protected by Letters Patent is set forth in the appended claims:

1. An electrical steering arrangement for steering a vehicle along a predetermined path comprising, in combination, conductor means for conducting alternating current, and establishing an electromagnetic field along said path; a first coil on said vehicle, said first coil defining an axis, said axis being horizontal and transverse to the direction of motion of said vehicle, said first coil being in proximity of the vehicle steering axle; a second coil arranged in front of said first coil in the direction of motion of said vehicle, said second coil defining an axis, said axis being vertical to the axis of said first coil, said first coil and said second coil being within said electromagnetic field and having induced voltages so that the voltage induced within said first coil is the reference signal for the voltage induced within said second coil; and means for determining the phase relationship between said induced voltages whereby the relative phase of said voltages in said coils is indictaive of the displacement of said vehicle from said path.

2. The electrical steering arrangement as defined in claim 1 including pole means for carrying said second coil.

3. The electrical steering arrangement as defined in claim 2 including means for securing fixedly said pole means to said vehicle.

4. The electrical steering arrangement as defined in claim 2 including means for securing said pole means to a steering member of said vehicle whereby a deflection of the wheels of said vehicle is transmitted in an analogous deflection to said pole means.

5. The electrical steering arrangement as defined in claim 1 including frequency generator means connected to said conductor means and comprising a quartz oscillator for determining the frequency of the output signal of said generator means; amplifier means connected to said generator means for amplifying the signal from said generator means; and means connected to said amplifying means for maintaining the output current of said amplifying means constant and independent of the resistance of said conductor means.

6. The electrical steering arrangement as defined in claim 1 wherein the amplitude of the regulating voltage signal induced within said second coil is indicative of the magnitude of the deflection of the vehicle from said predetermined path, the phase of the signal within said second coil being indicative of the direction of said deflection of said vehicle from said path when compared to the phase of the reference signal induced within said first coil.

7. The electrical steering arrangement as defined in claim 6 including a resonance amplifier connected to each coil, said resonance amplifier having inductances and capacitances in the oscillating circuits of said resonance amplifier and switching relay means for switching the inductances and capacitances to vary the frequency of the oscillating circuits of said resonance amplifier.

8. The electrical steering arrangement as defined in claim 1 including Schmitt trigger means for converting the induced sinusoidal voltages within said first and second coil into voltages of rectangular-shaped waveform; and AND gates connected to said Schmitt trigger means, said voltages of rectangular-shaped waveform being applied to said AND gates by said trigger means.

9. The electrical steering arrangement as defined in claim 8 wherein said AND gates comprise a first AND gate and a second AND gate, said first AND gate emitting an output signal when the phase of the voltage induced in said first coil is identical to the phase of the voltage induced in said second coil and said second AND gate emits an output signal when the voltage induced within said first coil is 180° out of phase with respect to the voltage induced within said second coil, whereby the output signal of said first AND gate is indicative of deflection of said vehicle to the left from said predetermined path and the output signal of said second AND gate is indicative of the vehicle deflection to the right of said path.

10. The electrical steering arrangement as defined in claim 9 including an RC network connected to the output of each AND gate for averaging the signal output of said AND gate; Schmitt trigger means connected to the output of each of said AND gates and emitting signals indicative of right and left deflections of said vehicle from said predetermined path.

11. The electrical steering arrangement as defined in claim 10 including pulse width control means connected to said Schmitt trigger means and applying correcting signals to the motor of said vehicle.

12. The electrical steering arrangement as defined in claim 11 including astable multivibrator means connected to said pulse width control means and emitting rectangular-shaped pulses having a duration below that required for operating said motor of said vehicle.

13. The electrical steering arrangement as defined in claim 12 wherein the pulse width of said rectangular-shaped pulses from said astable multivibrator is dependent upon the magnitude of the voltage induced in said second coil, the pulse width of said rectangular-shaped pulses increasing with increase in the amplitude of said signal induced within said second coil.

14. The electrical steering arrangement as defined in claim 13 including further AND gates each having one input connected to one Schmitt trigger and a second input connected to said pulse width control means.

15. The electrical steering arrangement as defined in claim 11 wherein said motor of said vehicle comprises a series connected motor with two separate field windings corresponding to right and left operating directions of said vehicle.

16. The electrical steering arrangement as defined in claim 15 wherein said pulse width control means energizes that winding of said motor whereby said vehicle is returned to said path after having deviated to one side from said path.

17. The electrical steering arrangement as defined in claim 16 including D hold means in said pulse width control means.

References Cited

UNITED STATES PATENTS

| | | | |
|---|---|---|---|
| 2,835,858 | 5/1958 | Moseley | 180—79.1 X |
| 2,847,080 | 8/1958 | Zworykin et al. | 180—98 |
| 3,008,532 | 11/1961 | Reed | 318—20.22 OUX |
| 3,009,525 | 11/1961 | DeLiban | 180—98 |
| 3,235,024 | 2/1966 | Barrett | 180—98 X |
| 3,482,644 | 12/1969 | Krieger et al. | 180—98 |

KENNETH H. BETTS, Primary Examiner

U.S. Cl. X.R.

318—587; 180—79.1